United States Patent [19]

Imazeki et al.

[11] 4,393,500

[45] Jul. 12, 1983

[54] METHOD OF MODIFYING DATA STORED IN NON-VOLATILE MEMORY AND TESTING FOR POWER FAILURE OCCURRING DURING MODIFICATION

[75] Inventors: Ryoji Imazeki, Hachioji; Michiya Inoue, Hino, both of Japan

[73] Assignee: Fujitsu Fanuc Limited, Tokyo, Japan

[21] Appl. No.: 179,840

[22] Filed: Aug. 20, 1980

[30] Foreign Application Priority Data

Sep. 4, 1979 [JP] Japan ................. 54-113260

[51] Int. Cl.³ .................. G06F 11/10; G11C 29/00
[52] U.S. Cl. ......................... 371/13; 371/66; 364/900; 365/1
[58] Field of Search ... 364/200 MS File, 900 MS File; 371/13, 66, 51; 365/222, 228, 205, 201

[56] References Cited

U.S. PATENT DOCUMENTS

| | | | |
|---|---|---|---|
| 4,216,541 | 8/1980 | Clover | 371/38 |
| 4,218,764 | 8/1980 | Furuta | 365/222 |
| 4,231,089 | 10/1980 | Lewine | 364/200 |

OTHER PUBLICATIONS

Byram and Ruiz, *Detection of and Recovery From Data Discontinuity*, IBM Tech. Disclosure Bulletin, vol. 20, No. 2, Jul. 1977.

*Primary Examiner*—Gareth D. Shaw
*Assistant Examiner*—Stephen A. Soffen
*Attorney, Agent, or Firm*—Staas & Halsey

[57] ABSTRACT

A method and system for rewriting data in a non-volatile memory of the type which requires a comparatively long period of time for the rewriting of stored data. The occurrence of an interruption in power can be detected on the basis of the content of the non-volatile memory, and detection takes place after the resumption of power even if the interruption in power takes place during the rewriting operation. The non-volatile memory is provided with a flag area in which information indicating the initiation of a modification is written prior to the rewriting operation, and in which information indicating the termination of a modification is written after the rewriting operation, whereby an interruption in power which has occurred during rewriting is readily detected by reading out the information from the flag area after the restoration of power.

3 Claims, 2 Drawing Figures

METHOD OF MODIFYING DATA STORED IN NON-VOLATILE MEMORY AND TESTING FOR POWER FAILURE OCCURRING DURING MODIFICATION

BACKGROUND OF THE INVENTION

This invention relates to a method of, and the associated system for, rewriting data in a non-volatile memory, by which an interruption in power, even if it occurs during the rewriting of data, can be detected with ease when the power is restored.

In computerized numerical control systems, a machining program is stored in a memory and then, when necessary, numerical control information in the program is read out successively from the memory to permit the execution of a numerical control process in accordance with the instructions.

Magnetic bubble memory units have recently found use in such memories and they exhibit a number of advantages such as their large capacity and low cost, and the fact that they are non-volatile in nature. One disadvantage, however, is a comparatively long access time. Specifically, a magnetic bubble memory is capable of reading and writing data in page units, such as 64-byte units, but has a comparatively long access time of several milliseconds per page. As a result, a considerable amount of time is required for an editing process consisting of deleting a portion of the machining program stored in the magnetic bubble memory, revising the data, and adding new numerical control information. In particular, a fairly long period of time is required to alter numerical control information over a plurality of access units (page units in the case of a magnetic bubble memory) at one time. Problems occur in dealing with interruptions in power that may arise during this extended period of time.

An interruption in power during an editing process will mutilate the data stored in a memory if the interruption should occur in the midst of a write operation. For this reason a method which relies upon a parity check or the like is adopted to enable detection of the power interruption after the power has been restored. An interruption in power can, however, occur at other times, such as when the memory is not being accessed during, for example, the preparation of altered data which is to be written. If an interruption in power occurs at such time, a portion of the stored data which is to be rewritten will be data after the editing and rewriting, and the remaining portion will be data prior to the editing and rewriting, so that the total data will be meaningless. Despite this occurrence, however, the power interruption will go undetected with the method that utilizes a parity check or similar technique. This can lead to a machining operation which is based on an incorrectly modified machining program, the end result being a wasted workpiece and a decline in machining efficiency. In view of the foregoing problems there is a need for a method and system which permit the detection of an interruption in power, even if this occurs during the rewriting of stored data in a non-volatile memory, after the power has been restored.

BRIEF SUMMARY OF THE INVENTION

The present invention discloses a method and system for the rewriting of data in a non-volatile memory, by which it is possible to readily detect an interruption in power, even if it has occurred during the rewriting of stored data in a non-volatile memory, after the power has been restored.

Accordingly, it is an object of the present invention to provide a method and system for rewriting data in a non-volatile memory, by which it is possible to readily detect an interruption in power, even if it has occurred during the rewriting of stored data in a non-volatile memory, after the power has been restored.

It is another object of the present invention to provide a method and system for rewriting data in a non-volatile memory, in which an interruption in power can be detected on the basis of the non-volatile memory content itself after the restoration of power.

It is still another object of the present invention to provide an improved method and system for rewriting data in a non-volatile memory, by which processing based on erroneous stored data can be prevented after the restoration of power following a power interruption.

Other features and advantages of the present invention will be apparent from the following description taken in conjunction with the accompanying drawings.

DETAILED DESCRIPTION OF THE PREFERRED EMBODIMENT

Figure 2:
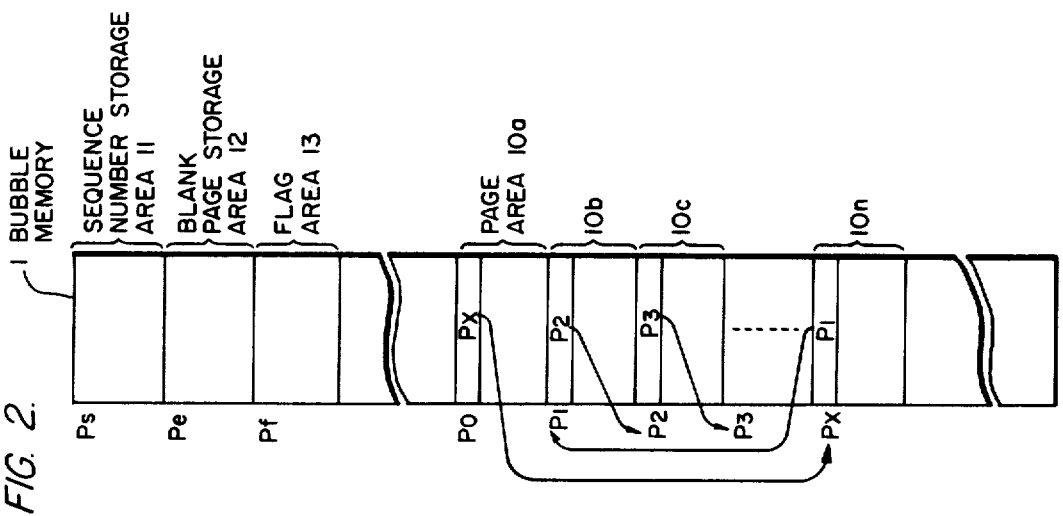
FIG. 2 is an illustrative view which is useful in describing the storage state in a bubble memory after a modification in accordance with the embodiment of the present invention.
Figure 1:
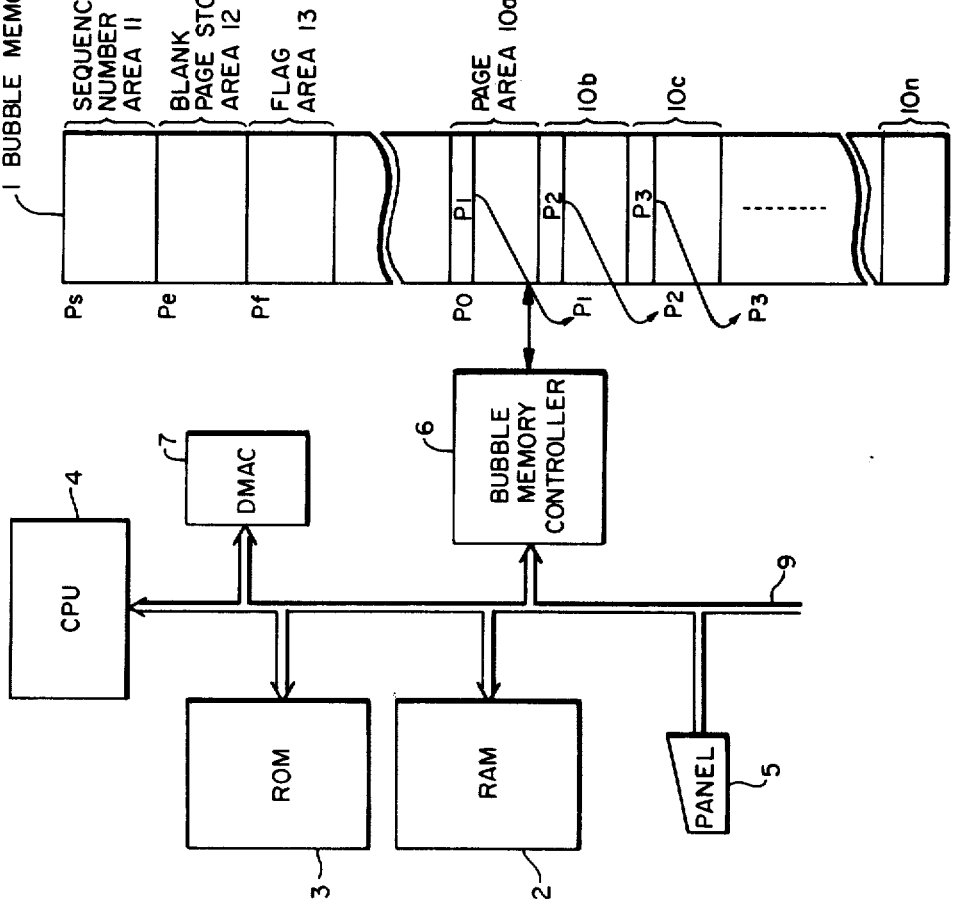
FIG. 1 is a block diagram which illustrates an embodiment of the present invention.

Referring to FIGS. 1 and 2, a magnetic bubble memory for storing a program such as a machining program is designated at numeral 1. The machining program is divided into page units which are stored in page areas $10a$, $10b$, $10c$, ..., $10n$, the reading and writing of data being carried out in accordance with the page units. Stored also in the page areas $10a$, $10b$, $10c$, ..., $10n$ are page addresses (pointers) of the page areas from which data is to be read out next. For example, the page addresses for the page areas $10a$, $10b$, $10c$, ..., $10n$ are $P_0$, $P_1$, $P_2$ ... and so forth. If the machining data is to be read out from the memory in the order of the page areas $10a$, $10b$, $10c$, ..., $10n$, then the page address $P_1$ will be stored in page area $10a$, the page address $P_2$ will be stored in page area $10b$, and so on in regular order. Numeral 13 denotes a flag area which is set to logical "1" prior to the initiation of an editing operation such as the alteration of a stored machining program, and which is reset to logical "0" after the completion of the editing operation. Numeral 12 denotes a blank page storage area for storing blank page information (the corresponding relationship between a page address $P_i$ and a blank page). Logical "0" is written in the blank page storage area 12 if there is no information such as machining data written at a page address $P_i$ ($i=0, 1, 2 ...$), but logical "1" is written therein if information such as the machining data has been written at the page address. Numeral 11 denotes a sequence number storage area for storing the corresponding relationship between a page address and a sequence number. The page addresses of the flag area 13, blank page storage area 12 and sequence number storage area 11 are $P_f$, $P_e$ and $P_s$, respectively.

A semiconductor memory 2 comprises a random access memory (RAM) and is adapted to store the data of the page unit read out from the magnetic bubble memory 1, modification information, the sequence number of the block which is to be modified, and other forms of data. A read-only control program memory 3 stores the control program. A processor 4, such as a microprocessor, executes editing and numerical control processes on the basis of the control program and machining program instructions. Numeral 5 denotes the operation panel of the numerical control unit, the panel having a manual data input switch (MDI) which is employed to enter modification data. Specifically, the operation panel 5 is used to enter such information as the sequence number $SN_i$ indicative of the block which is to be altered, the new numerical control data, and information indicative of deletions, additions and revisions, and is employed to transfer this information to the memory 2 where it is stored. A bubble memory controller 6 reads out data from the bubble memory 1, and writes data into the bubble memory 1, on a page-by-page basis in accordance with instructions from the processor 4. The instructions which the processor 4 sends to the bubble memory controller 6 consists of (a) the page lead address of the page area which is to be read or written, (b) the number of pages which are to be read or written, and (c) information indicative of the distinction between read and write. A direct memory access controller (DMAC) 7 responds to instructions from the processor 4 to transfer data, which has been read out from the memory 2, to the bubble memory controller 6, and to transfer data, which has been read through the bubble memory controller 6, to the memory 2. More specifically, when data is to be read out from the memory 2 and transferred to the bubble memory 1, the processor 4 supplies the DMAC 7 with an instruction indicative of the number of bytes of data which are to be read out from the memory 2, and the lead address of that location of the memory 2 from which the data is read. The DMAC 7 responds by reading out the data successively from the lead address of the memory 2 one byte at a time, and by transferring this data to the bubble memory controller 6 which takes this data and writes it in the prescribed page area of the bubble memory 1. On the other hand, when the data read out from the bubble memory 1 via the bubble memory controller 6 is to be transferred to and stored in the memory 2, the processor 4 supplies the DMAC 7 with an instruction indicative of the total number of bytes of data to be written in the memory 2, and indicative of the lead address of the location in which the data is to be written. Thus, data obtained from the bubble memory controller 6 is written in memory 2 one byte at a time. Numeral 9 denotes a common bus which handles the transfer of the foregoing data and instructions.

In describing the operation an example of a rewrite procedure will be explained in which a new block of information is to be written between two blocks of a machining program, which blocks will have the sequence numbers $SN_i$ and $SN_{i+1}$. Modification information (such as the sequence number $SN_i$, new block information and an addition instruction) is entered using the operation panel 5 which also is employed to start the editing process. When this instruction is delivered the central processing unit (CPU) 4 is placed under the control of the editing program which has been stored in the control program memory 3.

In operation, the CPU 4 instructs the bubble memory controller 6 of the page address $P_f$ of the flag area 13 and the number of bytes which are to be read, and at the same time instructs the DMAC 7 of the lead address of that location of the memory 2 into which the data read out from the bubble memory 1 is to be planted, and of the total number of bytes. The bubble memory controller 6 responds by reading serially, in page units, the content stored in the flag area 13 having the page address $P_f$, delimiting this data into byte units. The bubble memory controller 6 responds also by sending a request to the DMAC 7. The DMAC 7, in response to the request, causes the data, which has been read out via the bubble memory controller 6, to be stored in the memory 2 one byte at a time successively from the designated lead address of the memory. Next the CPU 4 takes a prescribed flag bit from the data read out from the flag area 13, and sets this flag bit to a value of logical "1". Thereafter the CPU again instructs the bubble memory controller 6 of the page address $P_f$ and of the number of bytes which are to be written, and instructs the DMAC of the number of bytes which are to be read out from the memory 2, and of the lead address. In this manner the data having the flag bit set to the value of "1" is taken out of the memory 2 and written into the flag area 13 in an order which is the opposite of that described above. Thereafter the flag bit in the flag area 13, which flag bit is indicative of a modification initiation, remains at the value "1" as long as the modification operation is incomplete.

Next, the CPU 4 instructs the bubble memory controller 6 of the lead page address $P_s$ of the sequence number storage area 11, and of the number of pages, and instructs the DMAC 7 of the lead address of that location of the memory 2 into which the data read out from the bubble memory 1 is to be planted, and of the total number of bytes. Accordingly, the content of the sequence number storage area 11 is read out and then written in the memory 2 in the same fashion as was the case with the flag area 13. Then, using the correspondence table between the sequence number and page address which has been read out from the sequence number storage area, the CPU 4 retrieves the page address of the location which stores the sequence number $SN_i$ entered by the operation panel 5. Upon retrieving the page address the CPU instructs the bubble memory controller 6 of the page address and number of pages, and instructs the DMAC 7 of the lead address of that location of the memory 2 into which the data read out from the bubble memory 1 is to be planted, and of the total number of bytes. It will be assumed that the block information of the sequence numbers $SN_i$, $SN_i+1$ has been stored at the page address $P_o$ of the bubble memory 1. Thereafter, machining daata is read out from the page area 10a at the page address $P_o$, and then written in memory 2. Next, the CPU 4 executes an editing process and edits the information in the sequence /$SN_i$ block information/, /new block information/, /$SN_{i+1}$ block information/, the machining data being altered within the memory 2. If all of this information can be planted in one page (that is, if the capacity of one page area is sufficient), then the CPU 4 instructs the bubble memory controller 6 of the page address $P_o$ and the number of pages (one), and instructs the DMAC 7 of the lead address of that location of the memory 2 at which the edited machining data is stored, and of the total number of bytes, the machining data being written in the page area 10a of the bubble memory 1 through the bubble memory controller 6.

If the total quantity of information, namely the /SN$_1$ block information/, /new block information/, and /SN$_{i+1}$ block information/, is greater than the storage capacity of one page, this information is divided into two portions, by way of example, and one portion must be written in page area 10a, and the other portion in the blank page. Accordingly, the CPU 4 first reads out, and sends to the memory 2, the blank page information from the blank page storage area 1c, thereby to retrieve the blank page, this being accomplished through the bubble memory controller 6 and the DMAC 7. It will be assumed that the page address of the blank page is P$_x$. The CPU 4 then executes an editing process which comprises forming first machining data which consists of the /page address P$_x$/, /SN$_i$ block information/, and a /portion of new block information/, forming second machining data which consists of /page address P$_1$/, a /remaining portion of new block information/, and /SN$_{i+1}$ block information/, writing the first machining data in the page area 10a of bubble memory 1, and writing the second machining data in the page area 10x at the page address P$_x$. See FIG. 2 in this connection. When this has been carried out, the blank page information is updated, the new blank page information which has been updated is written in the blank page area 12, and finally, the content of the flag area 13 is read out as in the manner described above, the flag bit is reset to "0", and then is written again in the flag area 13. If the operation is executed in this manner, the processing of the modification for adding the new block information will be complete.

In accordance with the foregoing operation, the flag bit of the flag area, which flag bit indicates the beginning of the program modification, will remain at logical "1" if the modification has not been completed because of an interruption in power or the like during the editing process. Therefore, after the restoration of power, or prior to beginning the machining operation, the data in the flag area is planted in the memory 2 as instructed by the CPU 4, in the same manner as the data is read out from the flag area as described above, the CPU 4 referring to the planted flag bit to readily enable detection of the power interruption.

While the present invention has been illustrated and described in connection with an embodiment wherein new block information is added, it is obvious that the invention can be applied also to the alteration and deletion of existing block information. In addition, while rewriting was effected over only two pages (page areas 10a and 10x), it can be effected equally as well over three or more pages. It should also be apparent that the present invention is not limited to a case in which only one modification flag bit is employed.

In accordance with the present invention as described and illustrated above, a specified area of a non-volatile memory device is designated a flag area, information indicating the initiation of a modification is written in the flag area prior to the modification of data stored in the memory, and information indicating termination of the modification is written in the flag area upon the termination of the modification operation. This makes it possible to detect, reliably and easily, the fact that an interruption in power has occurred during the modification of the memory content, this being accomplished merely by monitoring the content of the flag area. It follows, therefore, that machining will never take place under an incomplete machining program.

As many apparently widely different embodiments of the present invention can be made without departing from the spirit and scope thereof, it is to be understood that the invention is not limited to the specific embodiment thereof except as defined in the appended claims.

What we claim is:

1. A method of rewriting data in a bubble memory of a numerical control system having data input means, a bubble memory controller, and a processor, the bubble memory having a flag area and storing machining program data, comprising the steps of:
   (a) entering modification data for rewriting the machining program data stored in the bubble memory with the data input means;
   (b) reading the machining program data from the bubble memory with the bubble memory controller;
   (c) modifying the machining program data based on the modification data with the processor;
   (d) writing the modified machining data into the bubble memory with the bubble memory controller;
   (e) preparing initiation information, which indicates the initiation of a modification, and writing the initiation information in the flag area provided in the bubble memory with the processor and bubble memory controller before step (c)
   (f) preparing termination information, which indicates the termination of the modification, and writing the termination information in the flag area provided in the bubble memory with the processor and the bubble memory controller after the termination of step (d); and
   (g) discriminating an occurrence of an interruption in power during the modification by reading out the information stored in the flag area with the processor and bubble memory controller.

2. The method according to claim 1,
   wherein step (e) includes the steps of:
   (h) reading out flag data stored in the flag area;
   (i) changing the flag data into flag data which indicates the initiation of the modification; and
   (j) writing the changed flag data into the flag area; and
   wherein the step (f) includes the steps of:
   (k) reading out the flag data stored in the flag area;
   (l) changing the flag data into flag data which indicates the termination of the modification; and
   (m) writing in the changed flag data into the flag area.

3. A method of modifying data units and testing for a power failure that occurs during modifications using flag data stored in a bubble memory with a processor, comprising the steps of:
   (a) reading out the flag data for one of the data units from the bubble memory with the processor;
   (b) modifying the flag data for the one of the data units with the processor to indicate that a modification of the one of the data units is underway;
   (c) writing the flag data back into the bubble memory with the processor;
   (d) reading, modifying and writing the one of the data units stored in the bubble memory with the processor;
   (e) reading out the flag data for the one of the data units with the processor;

(f) modifying the flag data for the one of the data units with the processor to indicate that the modification is completed;

(g) writing the flag data into the bubble memory with the processor;

(h) reading out the flag data from the bubble memory for all of the data units with the processor; and (i) testing the flag data for all of the data units with the processor to determine if all modifications have been completed, thereby determining if the power failure has occurred during modification of the data units.

* * * * *

UNITED STATES PATENT AND TRADEMARK OFFICE
CERTIFICATE OF CORRECTION

PATENT NO. : 4,393,500
DATED : July 12, 1983
INVENTOR(S) : Ryoji Imazeki et al

It is certified that error appears in the above-identified patent and that said Letters Patent is hereby corrected as shown below:

Column 4, line 55, "daata" should be --data--.

Column 6, line 29, after "(c)", insert --;--.

Signed and Sealed this

Seventh Day of February 1984

[SEAL]

Attest:

Attesting Officer

GERALD J. MOSSINGHOFF

Commissioner of Patents and Trademarks